United States Patent Office 2,702,050
Patented Feb. 15, 1955

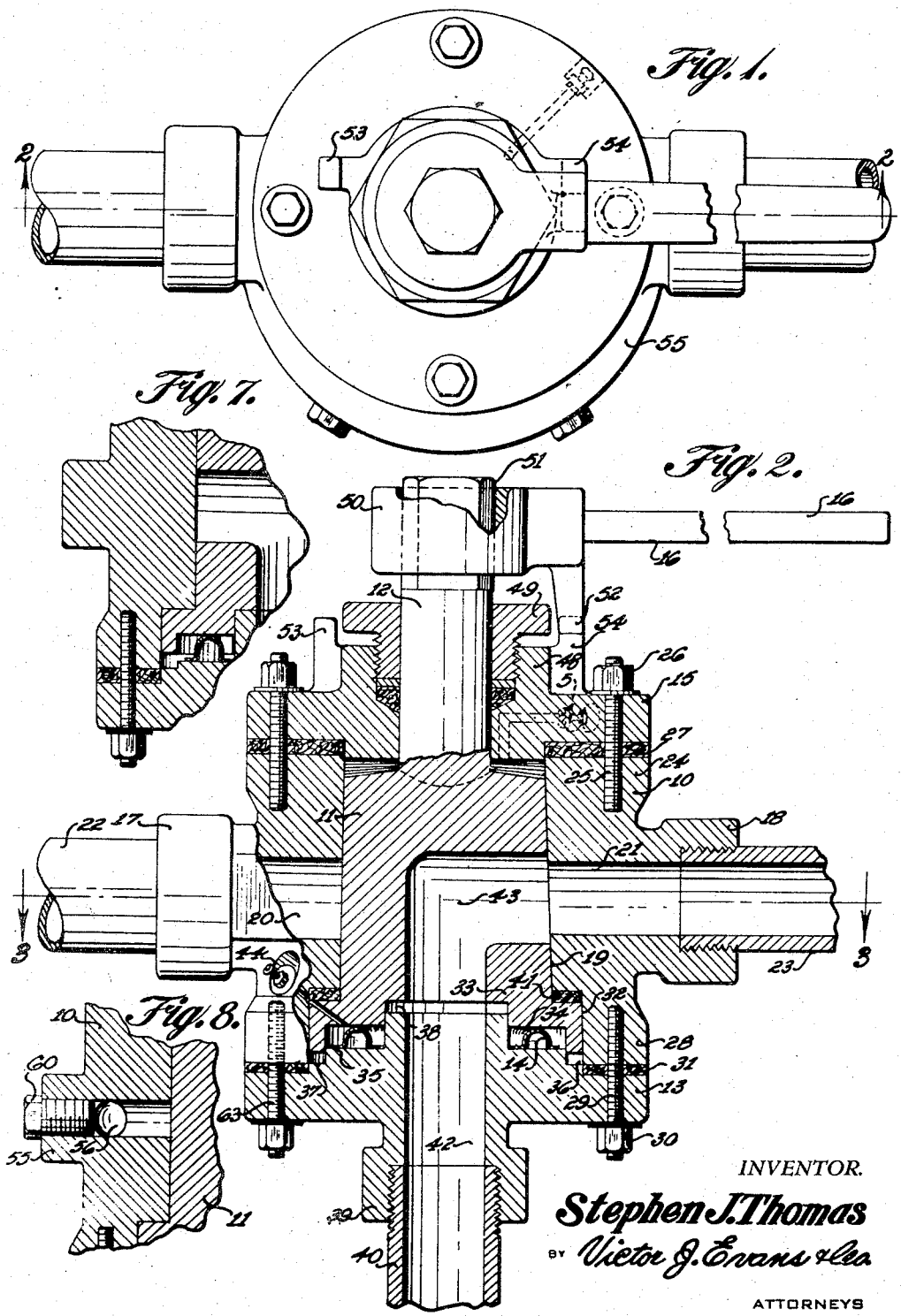

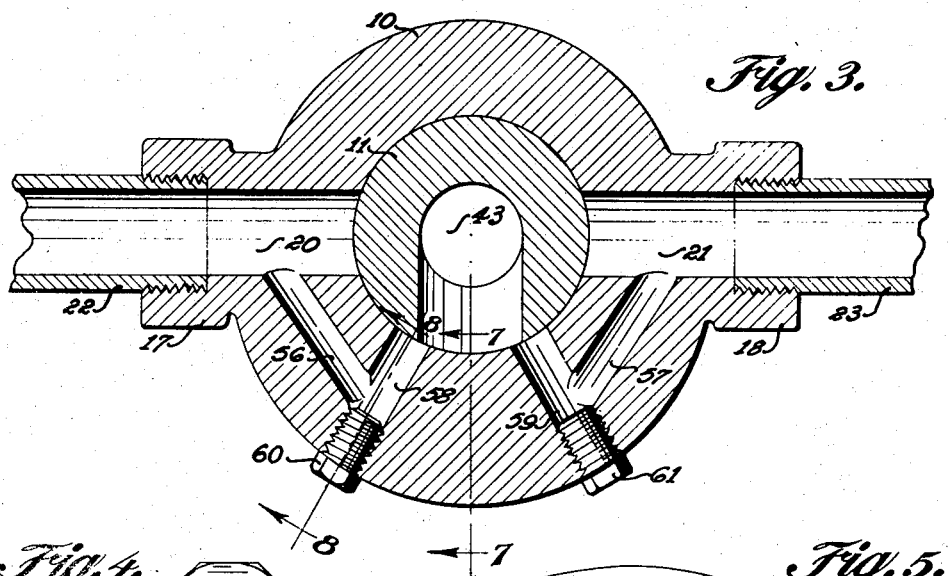
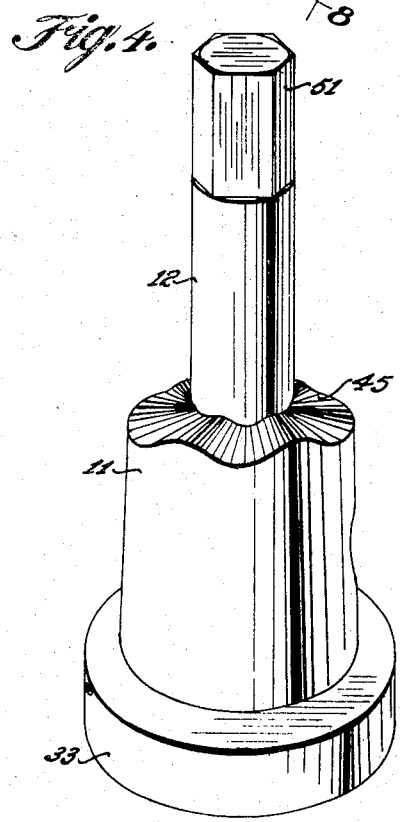
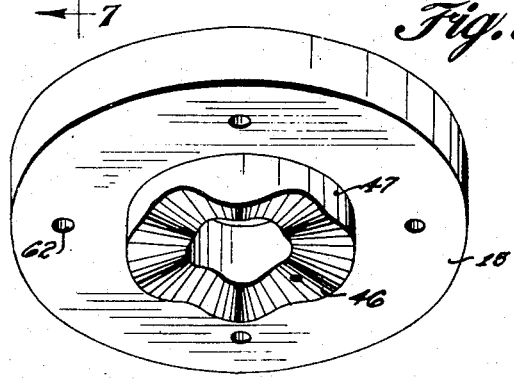
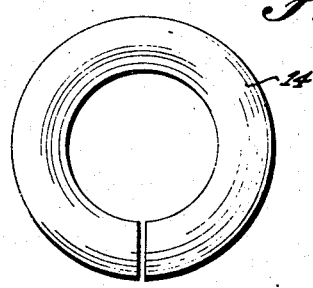

2,702,050

TWO-WAY BY-PASS HEADER VALVE

Stephen J. Thomas, Bellflower, Calif.

Application January 2, 1953, Serial No. 329,314

1 Claim. (Cl. 137—625.16)

This invention relates to header valves used for connecting pipe lines or groups of headers, or oil lines, such as lines extended to the east and west, and in particular a valve body having a supply connection in the lower end with branch connections extended from the sides and in which a core having an L-shaped passage therein is actuated by a handle or hand lever to connect the supply connection, selectively, to the branch connections having by-pass passages in combination therewith.

An important feature of the invention is to provide a two-way by-pass header valve having a by-pass side for high pressured line transportation where it is dangerous to bottle up the flow of fluids for even an instant, and a shut-off side adapted to be used as a conventional valve for low pressured lines.

The purpose of this invention is to provide a valve having a conical-shaped core with means for releasing the gripping action of the core against the inner surface of the valve body to facilitate rotating the core to open and close passages between connections of the valve body.

With the conventional type of valves having a conical-shape core the core is urged toward the small end of a valve opening in a valve body by a spring to take up wear in the valve continuously, and as valves of this type are not used continuously the cores often become lodged in the valve bodies thereby making turning of the core difficult. With this thought in mind this invention contemplates the use of cam surfaces at the end of a core of a conical shape whereby as the core is rotated it is moved by the cam surfaces toward the large end of the opening in the valve body thereby facilitating rotating the core.

The object of this invention is, therefore, to provide means in a valve having a conical shape core for depressing the core and breaking the seal upon rotation of the core.

Another object of the invention is to provide a header valve having an arrangement of by passes therein wherein bleeder connections are provided between a centrally disposed supply opening and branch connections, such as an east or west connection until the valve core arrives at the full open position of one of said branch connections.

A further object of the invention is to provide a universal header valve having by-pass connections therein and also having means for moving the valve core longitudinally as it is rotated in which the valve is of a simple and economical construction.

With these and other objects and advantages in view the invention embodies a valve body having a longitudinally disposed bore with a conical shaped intermediate section in said bore and with side connections extended from said conical shaped section, a conical shaped valve core having a supply connection extended into one end and positioned to communicate with a laterally disposed connection which registers, selectively, with side connections of the valve body and also having cam surfaces positioned to coact with similar surfaces at one end of the valve body whereby upon rotation of the valve core by a hand lever at the end of the valve the core moves longitudinally toward the large end of the conical shaped opening of the valve body thereby breaking the seal and relieving the core to facilitate rotation thereof, and also in which the valve body is provided with by-pass connections positioned to provide communicating passages between the opening in the core and the side connections of the valve body.

Other features and advantages of the invention will appear from the following description taken in connection with the drawing, wherein:

Figure 1 is a plan view of the improved by-pass header valve.

Figure 2 is a longitudinal section through the valve taken on line 2—2 of Fig. 1 showing the passage through the valve core communicating with one of the side connections of the valve body and in which parts are shown in elevation.

Figure 3 is a sectional plan through the valve taken on line 3—3 of Fig. 2.

Figure 4 is a detail illustrating the valve core with other parts of the valve removed.

Figure 5 is a detail illustrating a flange, somewhat similar to a valve bonnet adapted to be mounted on the upper end of the valve body and having cam surfaces on a cylindrical section thereof with the cam surfaces positioned to coact with similar surfaces on the valve core.

Figure 6 is a detail illustrating a spring washer positioned at one end of the valve core and adapted to urge the valve core into sealing relation with the conical-shape section of the valve body.

Figure 7 is a section taken on line 7—7 of Fig. 3 showing the lower portion of the valve body between the by-pass connections and with the major portion of the valve body broken away.

Figure 8 is a section taken on line 8—8 of Fig. 3 showing a section through one of the by-pass connections.

Referring now to the drawings wherein like reference characters denote corresponding parts the improved by-pass header valve of this invention includes a valve body 10, a valve core 11 having a stem 12 extended upwardly from the upper end, a base flange 13 mounted on the lower end of the valve body, a spring washer 14, a bonnet flange 15 and a hand lever 16.

The valve body 10 is provided with side connections or branches 17 and 18, and a longitudinally disposed core, which extends through the valve body is provided with an intermediate frusto conical-shaped section 19 that is positioned to coact with the frusto conical shape section of the core 11 whereby with the core urged by the spring washer 14 away from the base flange 13 the surface of the core is in sealing relation with the inner surface 19 of the valve body.

The side connection 17 is provided with an opening or passage 20 and a similar passage, as indicated by the numeral 21 extends through the side connection 18. The connections are provided with pipe sections 22 and 23 which convey oil to tanks, tank cars or other containers.

The upper end of the valve body is provided with a hub 24 to which the flange 15 is secured with bolts 25 having nuts 26 thereon and the connection between the bonnet flange 15 and valve body is sealed with a packing washer 27.

The lower end of the valve body is provided with a hub 28 to which the base flange 13 is secured with stud bolts 29 and nuts 30 and a packing washer 31 is positioned between the flange 13 and end of the valve body.

The valve body 10 is also provided with a counterbore 32 that is positioned at the large end of the conical-shape core 19 and, as shown in Fig. 2, the counterbore is positioned to receive a flange 33 of the lower end of the valve core; and the flange 33 is provided with a counterbore 34 in which the spring washer 14 is positioned and into which a shoulder 35 on the base flange 13 extends. The base flange is also provided with an annular recess 37 that is positioned to receive an annular flange 35 at the lower end of the valve core. The lower end of the valve core is also provided with an annular recess 38 into which a cylindrical section on the inner surface of the base flange 13 extends. The lower surface of the base flange 13 is provided with a hub 39 into which a supply tube or pipe 40 is threaded. A sealing washer 41 is also provided between the flange 33 and the valve body.

The base flange 13 is also provided with a longitudinally disposed bore 42 that provides communicating means between the pipe 40 and an L-shaped passage 43 in the valve core.

The lower end of the valve body may also be provided with a grease or Alemite fitting 44 through which lubricant may be supplied to the spring washer 14, and a similar fitting 5 is provided in the flange 15 for supplying grease to the cam surfaces.

The upper end of the valve core 11 is provided with a series of cam surfaces 45 that are positioned to coact with similar cam surfaces 46 on a cylindrical section 47 of the bonnet flange 15 and with the bonnet flange securely bolted to the valve body the coacting cam surfaces cause the valve core to move longitudinally in the valve body as it is rotated by the hand lever 16 at the upper end of the valve.

The bonnet flange 15 is also provided with a hub 48 into which a valve gland 49 is threaded and the hand lever or wrench 16 is provided with a hub 50 that is positioned on a stud 51 on the upper end of the valve stem. The stud 51 is provided with flat sides and the hub 50 is provided with a bore also having flat sides whereby with flat sides of the hub corresponding to the flat sides of the stud the valve core is readily rotated by the lever.

The hub 50 is also provided with a projecting finger 52 that is positioned to engage stops 53 and 54 on the bonnet flange 15 thereby providing means for limiting the travel of the lever 16 and also providing indicating means whereby the movement of the lever is terminated as a laterally extended end of the passage 43 of the valve core registers with one of the openings 20 or 21 of the connections 17 and 18 of the valve body.

The valve body is provided with an enlarged section 55 in which by-pass connections 56 and 57 are provided, the connection 56 opening into the passage 20 of the side connection 17 and the by-pass 17 opening into the passage 21 of the side connection 18.

The opposite ends of the by-pass connections 56 and 57 open into radially disposed openings 58 and 59, respectively which extend through the valve body and the outer ends of which are closed by the plugs 60 and 61.

The bonnet flange 15 is provided with radially disposed openings 62 through which the stud bolts 25 extend and similar openings 63 are provided in the base flange 13 for the bolts or studs 29.

With the parts arranged in this manner bleeder passages are provided from the passage 43 of the valve core to the by-pass connections in the sides of the valve body with the valve core in the central or neutral position and as the valve core is turned in a clockwise or counter-clockwise direction the opening at one side is closed and the opening at the opposite side increased until the valve core is turned to an angle of 90 degrees or to the full open position in which it communicates with one of the side connections 17 or 18.

Although the two-way by-pass valve of this invention is disclosed as being particularly adapted for oil wells and similar equipment, it is also adapted for other uses such as steam plants, water power installations, refineries and the like.

In this movement the cam surfaces force the valve core toward the large end of the opening thereby breaking the seal between the valve core and valve body and at the same time permitting free movement of the valve core. As the valve core is released the spring washer 14 urges the core toward the small end of the opening in the valve body whereby the passage through the valve body is again sealed.

It will be understood that modifications, within the scope of the appended claim, may be made in the design and arrangement of the parts without departing from the spirit of the invention.

What is claimed is:

In a valve, a body, a core mounted in said body and having a stem extended upwardly therefrom, a flange on the upper and lower end of said body, conduits connected to opposite sides of said body, said core being provided with a frusto-conical section for engagement with a frusto-conical bore in said body, a spring washer for urging said core away from said lower flange, a hub on the lower and upper end of said body and having said flanges connected thereto, there being a counterbore in said body for receiving a flange on the lower end of said core, said last named flange being provided with a recess for receiving said spring washer, there being an annular recess in the lower end of said valve core for receiving a cylindrical section of the lower flange, a supply pipe threadedly engaging said lower flange, there being an L-shaped passageway in said core for selectively connecting said supply pipe to said branches, a series of cam surfaces on the upper end of said core, said upper flange having a cylindrical section provided with cam surfaces for engagement with the cam surfaces of said core for causing said core to move longitudinally in said body, a stud on the upper end of said stem provided with flat sides, a lever having a hub engaging the flat sides of said stud, a finger projecting from the hub of said lever, stops on said upper flange engaged by said finger for limiting the travel of said lever, said body having radially disposed openings communicating with bypass connections and with the bore in said body, said by-pass connections also communicating with said conduits, and plugs closing the outer ends of said radially disposed openings.

References Cited in the file of this patent

UNITED STATES PATENTS

| | | |
|---|---|---|
| 2,289,721 | Mueller | July 14, 1942 |
| 2,299,666 | Turner | Oct. 20, 1942 |
| 2,449,733 | Wilkening | Sept. 21, 1948 |